United States Patent
Du et al.

(10) Patent No.: US 11,966,612 B2
(45) Date of Patent: Apr. 23, 2024

(54) SOLID-STATE DISK (SSD) DATA MIGRATION

(71) Applicant: Huawei Technologies Co., Ltd., Shenzhen (CN)

(72) Inventors: Ge Du, Chengdu (CN); Yu Hu, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 1025 days.

(21) Appl. No.: 16/809,026

(22) Filed: Mar. 4, 2020

(65) Prior Publication Data

US 2020/0233601 A1 Jul. 23, 2020

Related U.S. Application Data

(63) Continuation of application No. PCT/CN2017/100586, filed on Sep. 5, 2017.

(51) Int. Cl.
*G06F 3/06* (2006.01)
*H04L 61/5007* (2022.01)

(52) U.S. Cl.
CPC .......... *G06F 3/0647* (2013.01); *G06F 3/0619* (2013.01); *G06F 3/0659* (2013.01); *G06F 3/067* (2013.01); *G06F 3/0688* (2013.01); *H04L 61/5007* (2022.05)

(58) Field of Classification Search
CPC .... G06F 3/0647; G06F 3/0619; G06F 3/0659; G06F 3/067; G06F 3/0688; H04L 61/5007
See application file for complete search history.

(56) References Cited

U.S. PATENT DOCUMENTS

| | | | |
|---|---|---|---|
| 10,382,401 B1* | 8/2019 | Lee | H04L 63/166 |
| 2004/0078462 A1 | 4/2004 | Philbrick et al. | |
| 2007/0041383 A1* | 2/2007 | Banikazemi | H04L 69/16 |
| | | | 370/395.3 |
| 2012/0059994 A1 | 3/2012 | Montgomery et al. | |
| 2012/0166736 A1* | 6/2012 | Yamamoto | G06F 3/0665 |
| | | | 711/147 |
| 2012/0221671 A1 | 8/2012 | Chen et al. | |
| 2013/0042238 A1 | 2/2013 | Cardona et al. | |
| 2013/0046920 A1 | 2/2013 | Ryu et al. | |

(Continued)

FOREIGN PATENT DOCUMENTS

| | | |
|---|---|---|
| CN | 1547348 A | 11/2004 |
| CN | 101702688 A | 5/2010 |

(Continued)

*Primary Examiner* — Michelle T Bechtold
(74) *Attorney, Agent, or Firm* — Conley Rose, P.C.

(57) ABSTRACT

A method for migrating data by a source network interface card includes: receiving a first migration instruction; sending a read instruction to the source SSD when receiving the first migration instruction, where the read instruction is used to instruct the source SSD to read the to-be-migrated data into the source migration cache; and sending a second migration instruction to a target intelligent network interface card of the target storage array after the to-be-migrated data is read from the source SSD, where the second migration instruction is used to instruct the target intelligent network interface card to migrate the to-be-migrated data in the source migration cache to the target storage array.

20 Claims, 13 Drawing Sheets

(56) References Cited

U.S. PATENT DOCUMENTS

| | | |
|---|---|---|
| 2014/0215262 A1 | 7/2014 | Li et al. |
| 2014/0281168 A1* | 9/2014 | Koseki .................. G06F 3/0653 711/103 |
| 2016/0041915 A1* | 2/2016 | Hostetter ........... G11B 5/00813 709/217 |
| 2016/0364268 A1 | 12/2016 | Okada et al. |
| 2017/0123715 A1* | 5/2017 | Zhang ................. G06F 13/4068 |
| 2017/0180503 A1 | 6/2017 | Kelly et al. |
| 2018/0157445 A1 | 6/2018 | Gissin et al. |
| 2018/0173425 A1* | 6/2018 | Feng .................. G06F 12/0238 |

FOREIGN PATENT DOCUMENTS

| | | |
|---|---|---|
| CN | 102244579 A | 11/2011 |
| CN | 102333037 A | 1/2012 |
| CN | 102651690 A | 8/2012 |
| CN | 103970481 A | 8/2014 |
| CN | 107077426 A | 8/2017 |
| WO | 2013024402 A1 | 2/2013 |

\* cited by examiner

SOLID-STATE DISK (SSD) DATA MIGRATION

CROSS-REFERENCE TO RELATED APPLICATIONS

This is a continuation of Int'l Patent App. No. PCT/CN2017/100586 filed on Sep. 5, 2017, which is incorporated by reference.

TECHNICAL FIELD

The present disclosure relates to the field of storage technologies, and in particular, to a method for migrating data between storage devices.

BACKGROUND

Data migration frequently needs to be performed between different storage arrays in a storage system. For example, in the storage system, a quantity of solid-state drive (SSD) and a capacity of the SSD are large, and therefore there is a relatively high failure probability. To avoid a data loss, a to-be-invalidated SSD, that is, an SSD predicted to be invalidated, needs to be identified in advance, and then data in the SSD predicted to be invalidated is migrated to an SSD of another storage array in a cluster for backup.

In some approaches, when data is migrated between two storage arrays connected by using a network, memory space that is in a memory of a source storage array and that is dedicated to data migration first needs to be allocated, and then a controller of the source storage array reads data in a source SSD (an SSD from which the data is migrated, for example, a detected SSD predicted to be invalidated) into the memory space, and further sends a migration command to a network interface card of the source storage array. Then, the network interface card of the source storage array forwards the request to a network interface card of a target storage array. Further, the network interface card of the target storage array informs a controller of the target storage array. The controller of the target array needs to allocate a memory segment that is dedicated to data migration, and after the memory segment is allocated, the controller of the target storage array instructs the network interface card of the target storage array to migrate the data from the memory of the source storage array to a memory of the target storage array. The controller of the target storage array further writes the data in the memory of the target storage array into a flash memory of the target array.

It may be learned that, in some approaches, when data migration is performed between the storage arrays in the storage system, the migrated data needs to be migrated by using the controller of the source storage array, thereby occupying bandwidth of the controller of the source storage array and further occupying the memory of the source storage array and the memory of the target storage array. Therefore, normal access to data in another SSD in the array is affected, and performance of the entire storage system is affected. To reduce impact of data migration on the performance of the storage system, the bandwidth of the controller that is occupied during data migration is usually limited. This causes excessively long time of data migration, and increases a risk of a data loss. In addition, even if the bandwidth for data migration is limited, the performance of the storage system is still affected.

SUMMARY

Embodiments of the present disclosure provide a method for migrating data between storage arrays. During data migration, no controller bandwidth or memory of a source storage array and a target storage array is occupied, to ensure a data migration speed without affecting performance of a storage system.

A first aspect of the embodiments of the present disclosure provides a method for migrating data. The method is applied to a source intelligent network interface card, the source intelligent network interface card and a source solid state disk SSD belong to a source storage array and are interconnected, the source intelligent network interface card includes a source migration cache, the source migration cache includes access information, and the source SSD accesses the source migration cache based on the access information. The method includes: receiving a first migration instruction, where the first migration instruction carries an address of to-be-migrated data in the source SSD and information about a target SSD to which the to-be-migrated data is to be migrated, and the target SSD belongs to a target storage array; sending a read instruction to the source SSD, where the read instruction includes an address of the source SSD that is carried in the first migration instruction and the access information of the source migration cache, and the read instruction is used to instruct the source SSD to read the to-be-migrated data into the source migration cache; and sending a second migration instruction to a target intelligent network interface card of the target storage array, where the second migration instruction includes the access information of the source migration cache and an address of the target SSD that is determined based on the information about the target SSD, and the second migration instruction is used to instruct the target intelligent network interface card to migrate the to-be-migrated data in the source migration cache to the target storage array.

In the foregoing method for migrating data, when the data in the source storage array is migrated to the target storage array, in a data migration process, no controller bandwidth or memory of the source storage array is occupied, so that performance of the source storage array is not affected. In addition, the data migration process is not limited by the controller bandwidth of the source storage array, and therefore, a data migration speed is increased.

Further, the access information includes a memory address allocated by a controller of the source storage array to the source migration cache.

The memory address is allocated, so that the source SSD can access the source migration cache of the source intelligent network interface card.

Further, the information about the target SSD includes an Internet Protocol (IP) address of the target SSD, and the IP address of the target SSD is an IP address allocated by the source intelligent network interface card to the target SSD when a connection is established between the target storage array and the source storage array. In this way, the target intelligent network interface card may be determined based on the IP address that is in the information about the target SSD and that is of the target SSD, to send the second migration instruction to the target intelligent network interface card.

In an IP address mapping manner, the SSD of the target storage array may be mapped to the source storage array, and the source storage array may find the target intelligent network interface card based on the IP address of the SSD, to transmit data.

Further, the source intelligent network interface card stores a mapping relationship between the IP address of the target SSD and a disk identifier of the target SSD; and the information about the target SSD further includes a logical address for storing the to-be-migrated data in the target SSD. In this case, when the address of the target SSD is determined based on the information about the target SSD, the disk identifier of the target SSD may be first determined based on the mapping relationship and the IP address that is in the information about the target SSD and that is of the target SSD, and then, the disk identifier of the target SSD and the logical address for storing the to-be-migrated data in the target SSD are used as the address of the target SSD.

When the source intelligent network interface card receives the information about the target SSD sent by the target storage array, a mapping relationship between an IP address allocated to each target SSD and a disk identifier of each SSD is established, so that the disk identifier of the SSD can be determined based on the mapping relationship in the data migration process and the target SSD can be further easily determined, to implement data migration.

In another implementation, the information about the target SSD includes an IP address of the target intelligent network interface card, and the IP address of the target intelligent network interface card is an IP address allocated by the source intelligent network interface card to the target intelligent network interface card when the connection is established between the target storage array and the source storage array. In this case, the source intelligent network interface card may determine the target intelligent network interface card based on the IP address that is in the information about the target SSD and that is of the target intelligent network interface card.

In this way, in a manner of allocating the IP address to the target intelligent network interface card, the source storage array easily manages a virtual hard disk obtained by mapping the target storage array to the source storage array.

Further, the information about the target SSD further includes the disk identifier of the target SSD and the logical address for storing the to-be-migrated data in the target SSD. In this case, when the address of the target SSD is determined based on the information about the target SSD, the disk identifier of the target SSD and the logical address for storing the to-be-migrated data may be used as the address of the target SSD.

A second aspect of the embodiments of the present disclosure provides a method for migrating data. The method is applied to a target intelligent network interface card, the target intelligent network interface card and a target SSD belong to a target storage array and are interconnected, the target intelligent network interface card includes a target migration cache, the target migration cache includes access information, and the target SSD accesses the target migration cache based on the access information. The method includes: receiving a migration instruction sent by a source intelligent network interface card of a source storage array, where the migration instruction includes access information of a source migration cache of the source intelligent network interface card and an address of the target SSD, and the access information of the source migration cache is information about to-be-migrated data that is stored in the source migration cache and that is migrated from a source SSD; reading the to-be-migrated data in the source migration cache into the target migration cache according to the migration instruction; and sending a write instruction to the target SSD, where the write instruction includes information about the target migration cache and the address of the target SSD, and is used to instruct the target SSD to write the to-be-migrated data in the target migration cache into the target SSD.

In the foregoing method for migrating data, when the data in the source storage array is migrated to the target storage array, in a data migration process, no controller bandwidth or memory of the target storage array is occupied, so that performance of the target storage array is not affected. In addition, the data migration process is not limited by the controller bandwidth of the target storage array, and therefore, a data migration speed is increased.

Further, the access information includes a controller memory address allocated by a controller of the target storage array to the target migration cache.

The memory address is allocated, so that the target SSD can access the source migration cache of the target intelligent network interface card.

Further, when the to-be-migrated data in the source migration cache is read into the target migration cache according to the migration instruction, a read instruction is first generated according to the migration instruction, where a source address of the read instruction is the access information of the source migration cache in the migration instruction, and a target address of the read instruction is the access information of the target migration cache.

Further, information about the target SSD includes a disk identifier of the target SSD. In this case, when a write instruction is sent to the target SSD, the target intelligent network interface card determines the target SSD from a plurality of SSDs of the target array based on the disk identifier of the target SSD, and then sends the write instruction to the target SSD.

A third aspect of the embodiments of the present disclosure provides a source intelligent network interface card. The source intelligent network interface card and a source SSD belong to a source storage array and are interconnected, the source intelligent network interface card includes a source migration cache, the source migration cache includes access information, and the source SSD accesses the source migration cache based on the access information. The source intelligent network interface card further includes a receiving module, a read instruction module, a migration instruction module, and the like. Various modules of the source intelligent network interface card execute the method for migrating data provided in the first aspect of the embodiments of the present disclosure.

A fourth aspect of the embodiments of the present disclosure provides a target intelligent network interface card. The target intelligent network interface card and a target SSD belong to a target storage array and are interconnected, the target intelligent network interface card includes a target migration cache, the target migration cache includes access information, the target SSD accesses the target migration cache based on the access information, and the target intelligent network interface card includes a receiving module, a read module, a write instruction module, and the like. Various modules of the target intelligent network interface card execute the method for migrating data provided in the second aspect of the embodiments of the present disclosure.

A fifth aspect of the embodiments of the present disclosure provides a system for migrating data. The system for migrating data includes a source intelligent network interface card and a target intelligent network interface card, the source intelligent network interface card is the source intelligent network interface card according to the third aspect of the embodiments of the present disclosure, and the target intelligent network interface card is the target intelligent network interface card according to the fourth aspect of the embodiments of the present disclosure.

A sixth aspect of the embodiments of the present disclosure provides a source intelligent network interface card. The source intelligent network interface card stores a program instruction, and a processor of the source intelligent network interface card executes the program instruction to implement the method according to the first aspect of the embodiments of the present disclosure.

A seventh aspect of the embodiments of the present disclosure provides a target intelligent network interface card. The target intelligent network interface card stores a program instruction, and a processor of the target intelligent network interface card executes the program instruction to implement the method according to the second aspect of the embodiments of the present disclosure.

In various implementations of the foregoing embodiments of the present disclosure, migration caches provided by the source intelligent network interface card and the target intelligent network interface card may be used as data transit caches, and therefore, when the data is migrated, the migrated data does not pass through the controller or the memory of the source storage array or the target storage array, and the migrated data occupies no controller bandwidth or memory of the source storage array and the target storage array. This significantly reduces impact on the performance of the storage system and ensures the data migration speed.

BRIEF DESCRIPTION OF DRAWINGS

To describe the technical solutions in the embodiments of the present disclosure, the following briefly describes the accompanying drawings for describing the embodiments.

DESCRIPTION OF EMBODIMENTS

The following clearly describes the technical solutions in the embodiments of the present disclosure with reference to the accompanying drawings in the embodiments of the present disclosure. The described embodiments are merely some but not all of the embodiments of the present disclosure.

Figure 1:
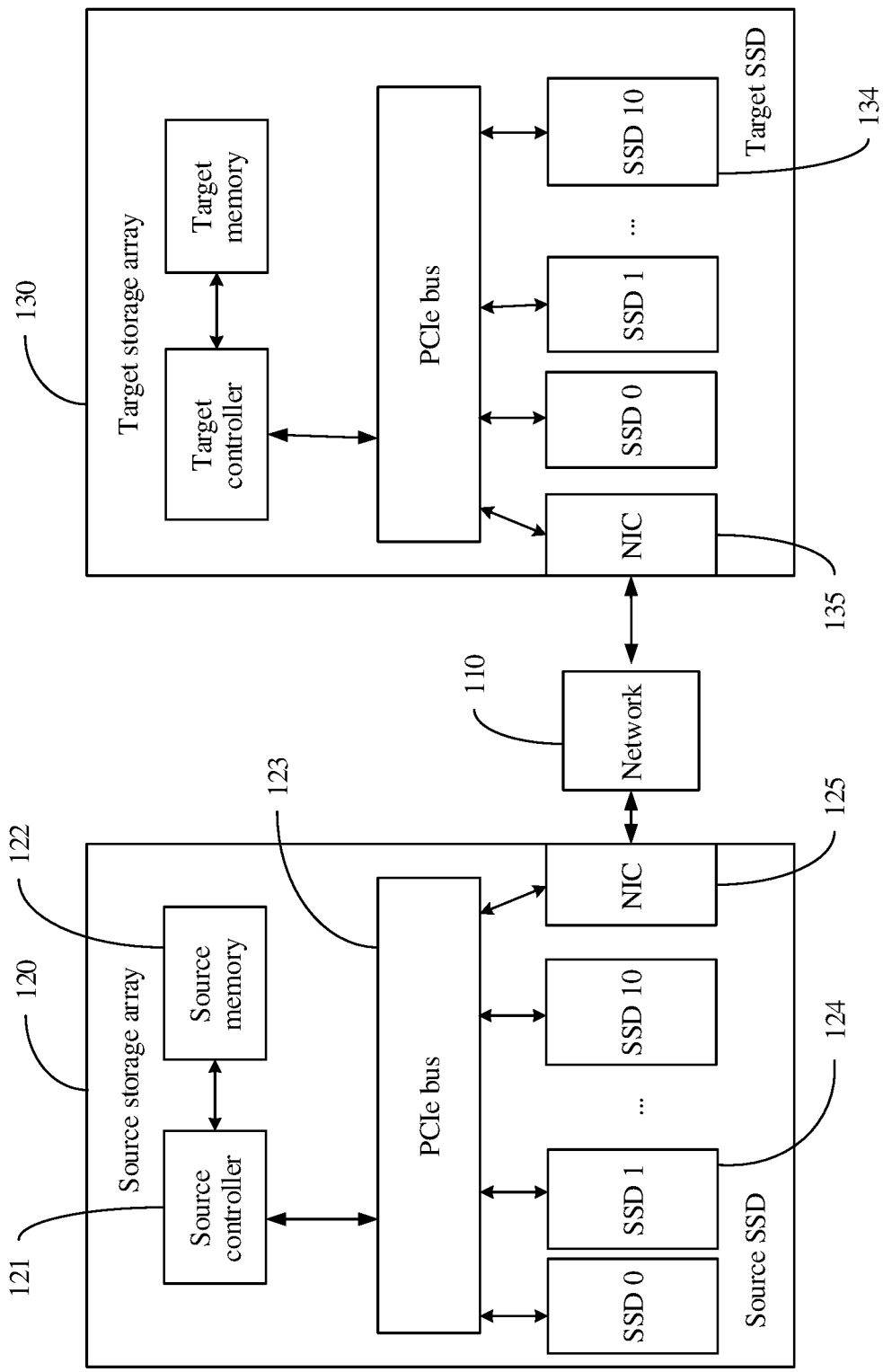
FIG. 1 is an architectural diagram of a storage system in some approaches.

As shown in FIG. 1, FIG. 1 is an architectural diagram of an existing storage system 100. The storage system 100 is a cluster including a plurality of storage arrays connected by using a network 110, and is usually used as a data center. For brevity, only two storage arrays are shown in the figure, namely, a source storage array 120 and a target storage array 130. The source storage array 120 is an SSD from which data is migrated, and the target storage array 130 is an SSD to which the data is migrated. The storage arrays communicate with each other by using a communications protocol that is based on an RDMA protocol.

Structures of the storage arrays are basically the same. The following uses the source storage array 120 as an example for description. The source storage array 120 includes a source controller 121, a source memory 122, a Peripheral Component Interconnect Express (PCIe) bus 123, a plurality of SSDs (namely, an SSD 0 to an SSD 10), and a network interface card (NIC) 125. The source memory 122 is connected to the source controller 121. The source controller 121 is connected to the plurality of SSDs and the network interface card 125 by using the PCIe bus 123. The network interface card 125 is connected to a network interface card of another storage array by using the network 110, to implement communication between the source storage array 120 and the another storage array such as the target storage array 130.

Link initialization is performed when a connection is established between the storage arrays in the storage system 100. During link initialization, based on the RDMA protocol, each storage array can map a local SSD to another storage array in the storage system, so that the another storage array directly accesses the local SSD. The source storage array 120 and the target storage array 130 are used as an example. During link initialization, the target storage array 130 maps local SSDs (an SSD 0 to an SSD 10) to the source storage array 120. In this case, the SSD 0 to the SSD 10 of the target storage array 130 may serve as virtual disks SSD 11 to SSD 21 of the source storage array 120, to be used by the source storage array 120. For details, refer to FIG. 4. A specific method in which the target storage array 130 maps the local SSD to the source storage array 120 to serve as the virtual SSD of the source storage array is as follows: During link initialization, the target storage array 130 selects an SSD that needs to be mapped to another storage array for use. In this embodiment, the target storage array 130 maps all local SSDs to the another storage array for use, and then sends information about each selected SSD, for example, a disk identifier, a disk size, and address space, to the another storage array such as the source storage array 120 by using a link to the another storage array. When SSD information sent by the target storage array 130 passes through the network interface card 125 of the source storage array 120, the network interface card 125 generates an IP address for each SSD, adds the IP address to information about each SSD, and then establishes a correspondence between each IP address and a disk identifier of each SSD. After receiving the information about each SSD, the source storage array 120 records the IP address of each SSD, identifies each SSD by using the IP address of the SSD, and then creates a disk object for the information about each SSD, that is, the virtual disk (for example, the SSD 11 to the SSD 21 in FIG. 4). In this way, the local SSD of the target storage array 130 may be mapped to the source storage array 120, to serve as the virtual disk of the source storage array 120. When accessing the virtual hard disk, the source storage array only needs to add an IP address of the virtual hard disk to access information.

Another method in which the target storage array 130 maps the local SSD to the source storage array 120 to serve as the virtual SSD of the source storage array is as follows: When SSD information sent by the target storage array 130 passes through the network interface card 125 of the source storage array 120, the network interface card 125 generates an IP address only for the network interface card 135 of the target storage array 130. The source storage array 120 marks each SSD by using the IP address and a disk identifier, and establishes a disk object. The disk identifier is a unique identifier allocated by each storage array to each SSD in the storage array. In this case, when accessing the virtual hard disk, the source storage array adds the IP address and the disk identifier of the virtual hard disk to the access information.

Data migration frequently needs to be performed between the storage arrays. For example, when the source storage array 120 detects a to-be-invalidated SSD, that is, a source SSD 124, data in the source SSD 124 needs to be migrated to another SSD, to avoid a data loss caused by invalidation of the source SSD 124. During migration, the data in the source SSD 124 may be migrated to an SSD of the same storage array or an SSD of another storage array. In this embodiment, only a case in which the data in the source SSD 124 is migrated to the SSD in the another storage array such as the target storage array 130 is described. A hardware structure of the target storage array 130 is the same as a hardware structure of the source storage array 120. In a description process, to differentiate elements included in the target storage array 130 from elements included in the source storage array 120, herein, the elements included in the target storage array 130 are respectively referred to as a target controller 131, a target memory 132, and a target SSD 134. The target SSD 134 is an SSD to which the data in the source SSD 124 is migrated.

Figure 3A:
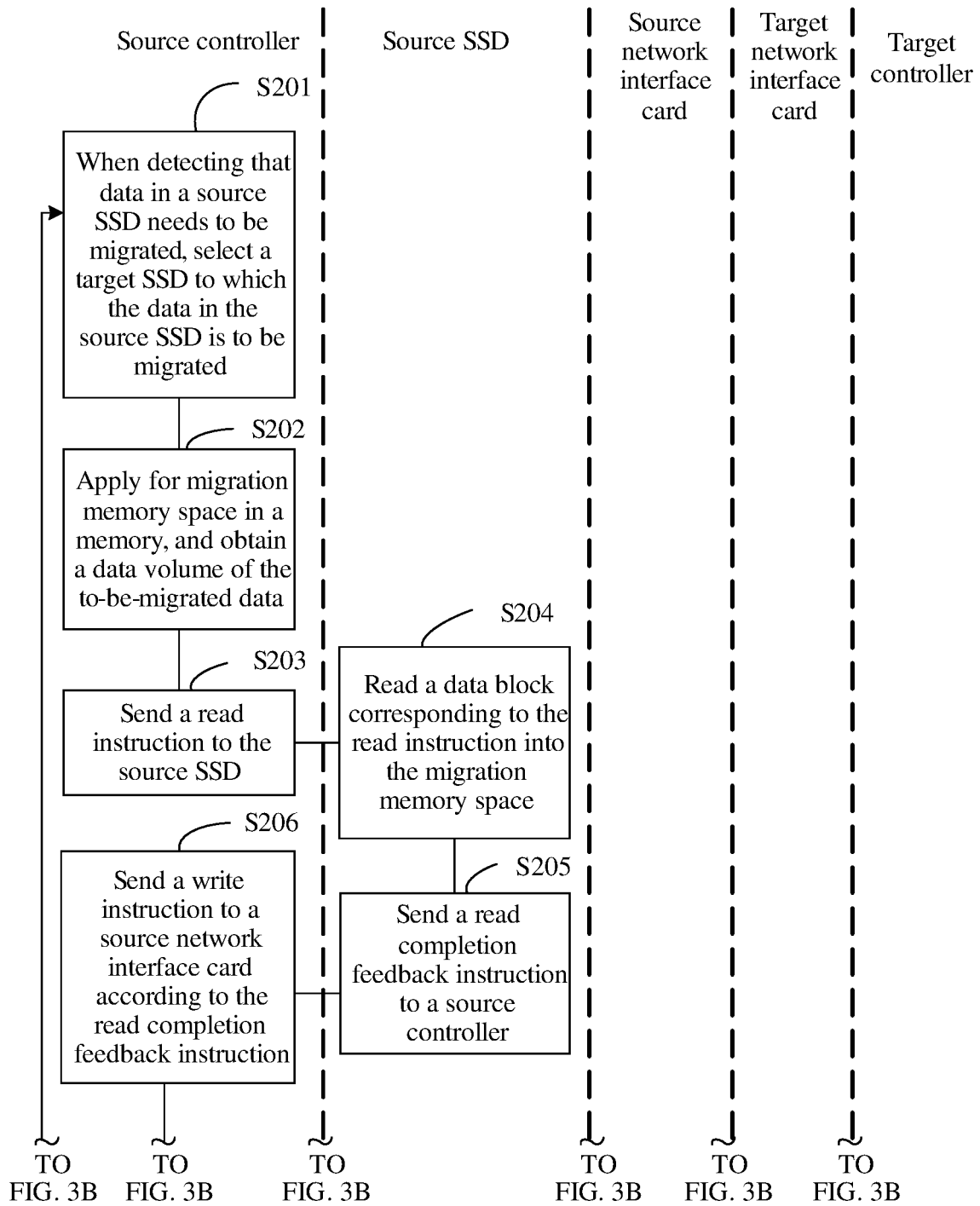
FIG. 3A, FIG. 3B, and FIG. 3C are a flowchart of a method for migrating data of a source storage array to a target storage array in some approaches.
Figure 3B:
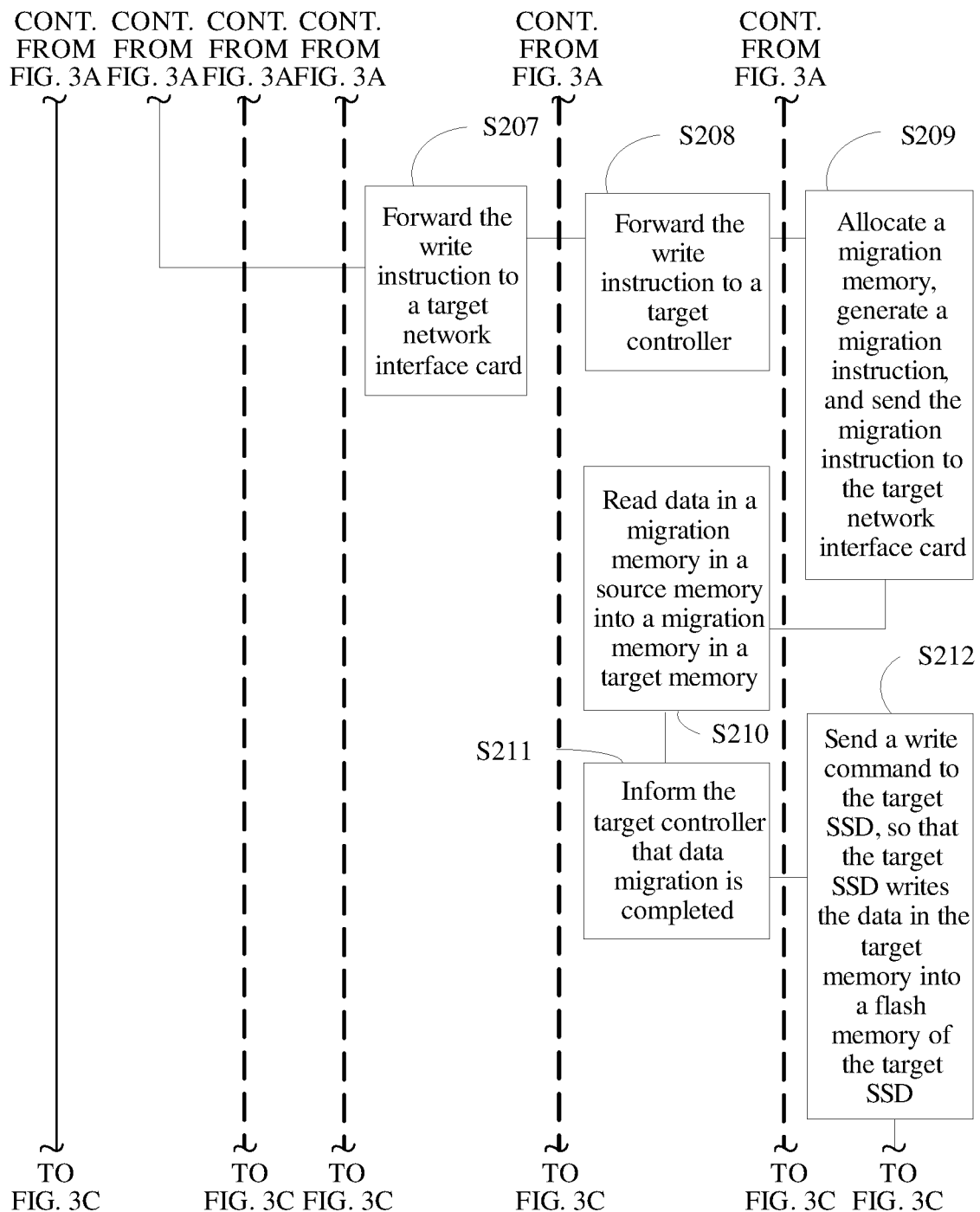
Figure 3C:
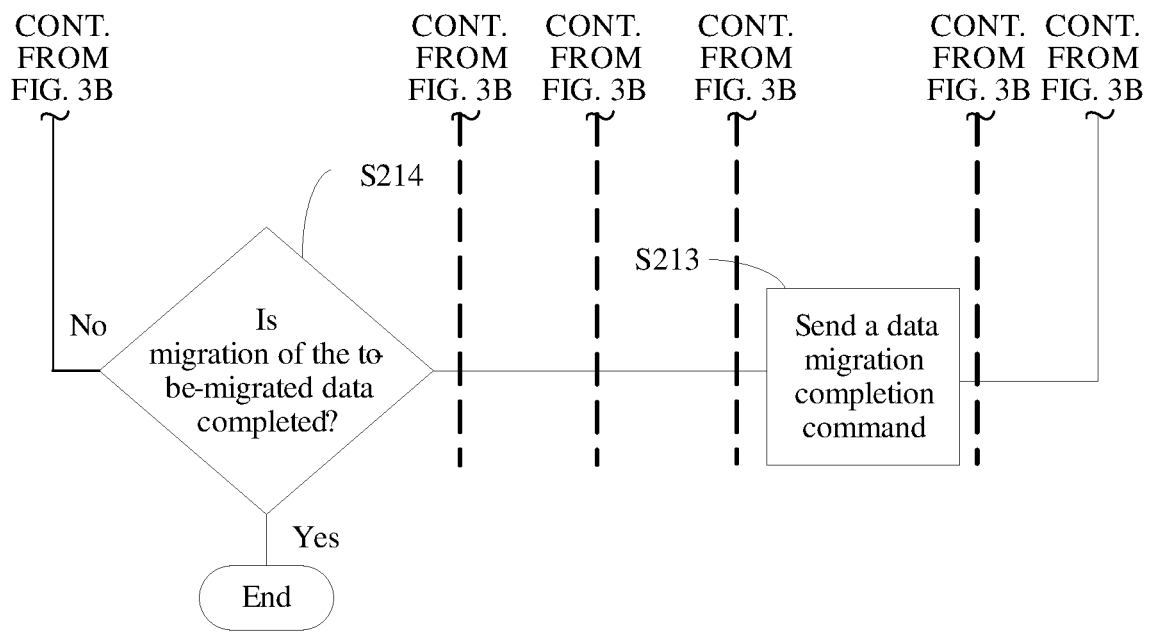

With reference to FIG. 3A, FIG. 3B, and FIG. 3C, the following describes a method for migrating the data in the source SSD 124 in the source storage array 120 to the target SSD 134 of the target storage array 130 in some approaches.

As shown in FIG. 3A, FIG. 3B, and FIG. 3C, in step S201, when detecting that the data in the source SSD 124 needs to be migrated, for example, detecting that the data of the source SSD 124 is to be invalidated, the source controller 121 selects, from the storage system 100, a target SSD to which the data in the source SSD is to be migrated. The target SSD may be a local SSD or a virtual SSD. Herein, only a case in which the target SSD is the virtual SSD is described, that is, a case in which the target SSD is located in a remote storage array.

Step S202: The source controller 121 applies for migration memory space that is in the source memory 122 and that is dedicated to data migration, and obtains a data volume of the to-be-migrated data.

Step S203: The source controller 121 generates a read instruction based on a length of the migration memory space and the obtained data volume of the to-be-migrated data, and sends the read instruction to the source SSD 124, where the read instruction instructs the source SSD 124 to migrate a data block whose size is equal to that of the migration memory space.

Step S204: The source SSD 124 reads, according to the read instruction, a data block that is in the source SSD and that is corresponding to the read instruction into the migration memory space.

Step S205: After completing execution of the read instruction, the source SSD 124 sends a read completion feedback instruction to the source controller 121.

Step S206: The source controller 121 sends a write instruction to the source network interface card 125 according to the read completion feedback instruction, where the write instruction instructs the source network interface card 125 to migrate data in a migration memory in the source memory 122 to the target SSD.

Step S207: After receiving the write instruction, the source network interface card 125 determines a target network interface card based on information about the target SSD in the write instruction, and then forwards the write instruction to the target network interface card 135.

Step S208: The target network interface card 135 further forwards the write instruction to the target controller 131.

Step S209: The target controller 131 allocates a migration memory in the target memory 132 according to the write instruction, generates a migration instruction, and sends the migration instruction to the target network interface card, where a source address of the migration instruction is an address of the migration memory in the source memory 122, and a target address of the migration instruction is an address of the migration memory in the target memory 132.

Step S210: The target network interface card 135 reads, according to the migration instruction, the data in the migration memory in the source memory 122 into the target migration memory in the target memory 132.

Step S211: After completing data migration, the target network interface card 135 informs the target controller that data migration is completed.

Step S212: The target controller sends a write instruction to the target SSD, so that the target SSD writes the data in the target memory into a flash memory of the target SSD.

Step S213: After receiving a migration completion command sent by the target SSD, the target network interface card 135 informs the source network interface card 125 that data migration is completed, and the source network interface card 125 further informs the source controller 121 that data migration is completed.

Step S214: After receiving the notification command, the source controller 121 determines whether migration of the to-be-migrated data is completed, where if migration is not completed, a procedure returns to step S201, and the procedure continues being executed until all to-be-migrated data in the source SSD 124 is migrated; or if migration is completed, the procedure ends.

It may be learned from the foregoing method for migrating data that, in some approaches, when the data in the source SSD is migrated to the target SSD, a data migration process needs to be controlled by the source controller and the target controller, and the migrated data needs to pass through the source memory 122 and the target memory 132 for migration. In this way, even if bandwidth of the source controller and bandwidth of the target controller that are occupied during data migration are limited, performance of the storage system is still affected. In addition, if the bandwidth of the source controller and the bandwidth of the target controller that are occupied during data migration are limited, a data migration speed is extremely low. This increases a risk of losing migrated data, and further affects reliability of the storage system.

In a method for migrating data provided in an embodiment of the present disclosure, when data is migrated from a source SSD to a target SSD, the data does not pass through a source memory or a target memory in a migration process, but is directly transmitted by using an interface of a PCIe switch, and a source controller only sends a command related to migration. Therefore, this occupies only little bandwidth of the source controller, and does not affect performance of a storage system. In addition, a data migration speed is not limited by the bandwidth of the source controller, and therefore, the data migration speed is increased. The following describes in detail the solution provided in this embodiment of the present disclosure.

Figure 4:
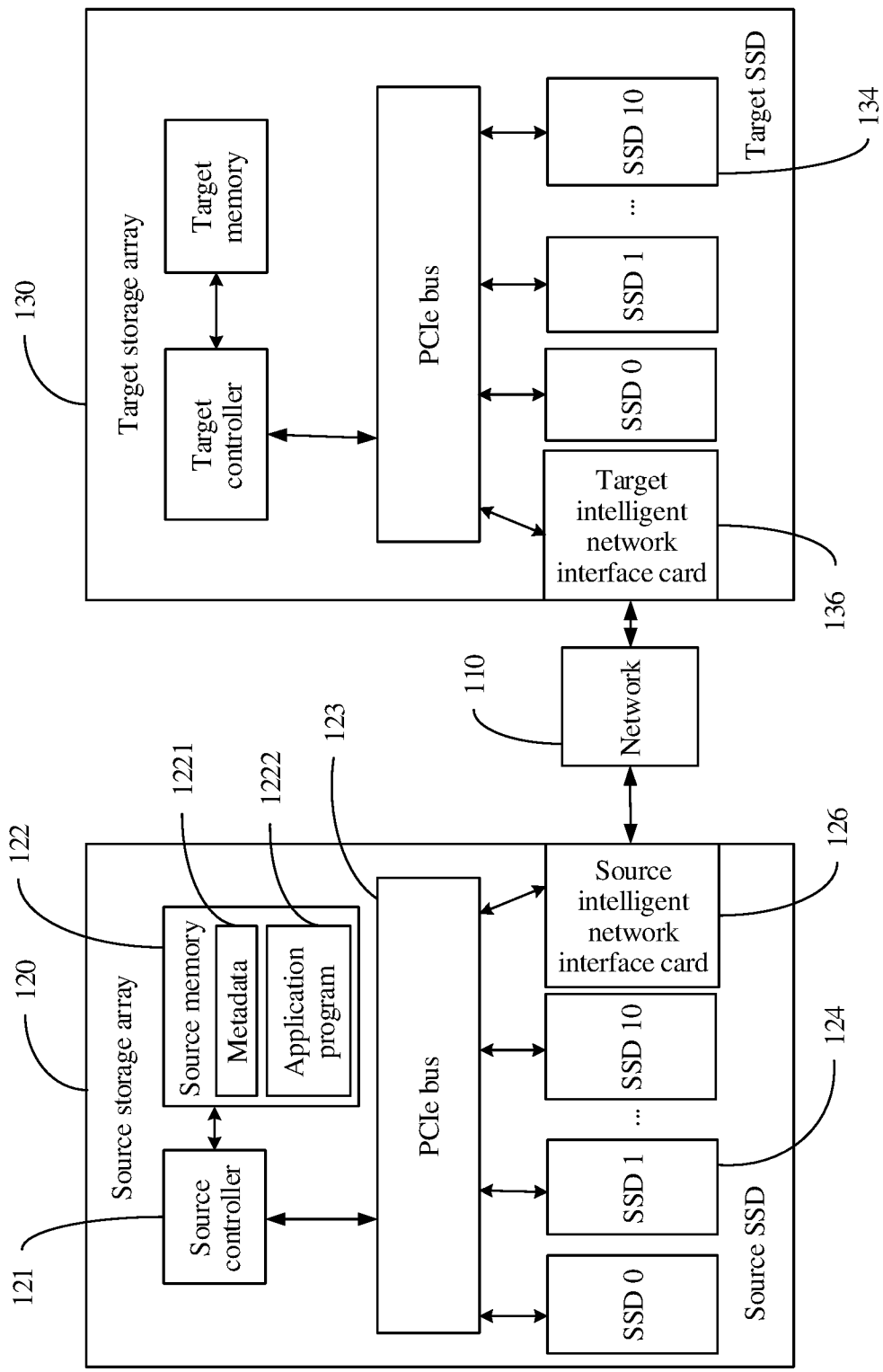
FIG. 4 is an architectural diagram of a storage system according to Embodiment 1 of the present disclosure.

As shown in FIG. 4, FIG. 4 is an architectural diagram of a storage system according to Embodiment 1 of the present disclosure. An architecture of the storage system in Embodiment 1 is similar to the architecture of the storage system in FIG. 1, and a difference is that a network device connecting the source storage array 120 to the target storage array 130 is changed from the original network interface card to an intelligent network interface card having a control function. For ease of description, an intelligent network interface card in the source storage array 120 is referred to as a source intelligent network interface card 126, and an intelligent network interface card in the target storage array 130 is referred to as a target intelligent network interface card 136. The source intelligent network interface card 126 and the target intelligent network interface card 136 communicate with each other by using a communications protocol based on an RDMA protocol, such as an NOF protocol.

The source controller 121 is configured to run an application program 1222 in the source memory 122, to implement some functions provided by the source storage array 120, for example, control of fetch and migration of data in the SSD 0 to the SSD 10 and control of a data transmission process of the source intelligent network interface card 126. The source memory 122 further stores metadata 1221 of the SSD 0 to the SSD 10 and the source intelligent network interface card 126. The metadata 1221 records information about data stored in each SSD, for example, a data volume of the stored data, logical address information of the stored data, and access information of a migration cache of the source intelligent network interface card 126. The access information of the migration cache is described in detail below.

Figure 5:
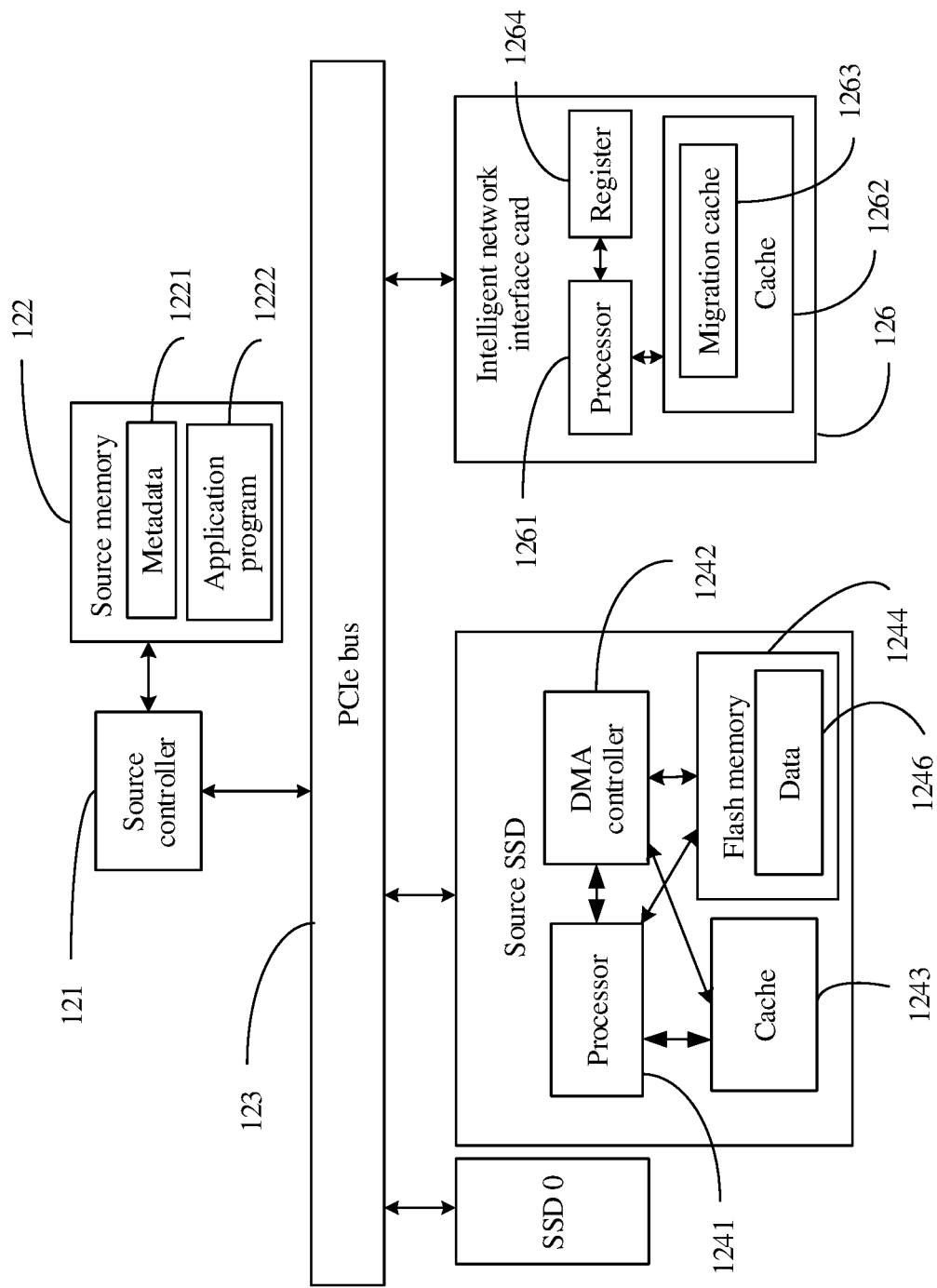
FIG. 5 is an architectural diagram of a source storage array according to Embodiment 1 of the present disclosure.
Figure 6:
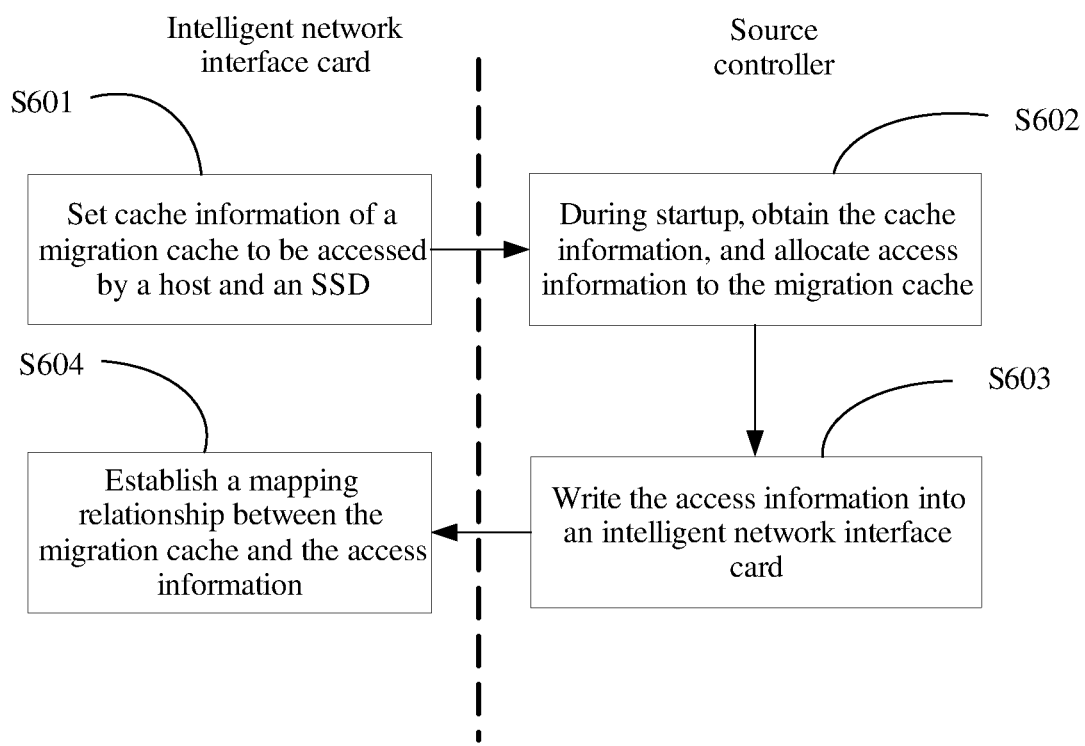
FIG. 6 is a flowchart of a method for allocating access information to a source intelligent network interface card in a source storage array according to an embodiment of the present disclosure.

In this embodiment of the present disclosure, structures of the source storage array 120 and the target storage array 130 are basically the same. Herein, only the source storage array 120 is used as an example to describe a structural diagram of each element in the storage array. A structural diagram of the source intelligent network interface card 126 is first described, and a structure of the target intelligent network interface card 136 is the same as a structure of the source intelligent network interface card 126. Herein, only the source intelligent network interface card 126 is used as an example for description. As shown in FIG. 5, the source intelligent network interface card 126 includes a processor 1261 and a cache 1262, a migration cache 1263 is further disposed in the cache 1262, and the processor 1261 further includes a register 1264. The cache 1262 stores a program instruction (not shown in the figure), and the processor 1261 executes the program instruction to implement a function indicated by the program instruction. The migration cache 1263 may be accessed by the source controller 121 and the SSD. For a method in which the migration cache 1263 is accessed by the source controller 121 and the SSD, refer to a flowchart shown in FIG. 6.

Step S601: The source intelligent network interface card 126 sets cache information of the migration cache 1263 in the register 1264 of the processor 1261. In this embodiment, the cache information includes a size of the migration cache.

Step S602: In a BIOS startup phase of the source storage array 120, the source controller 121 reads the cache information of the migration cache 1263 from the register 1264 of the processor 1261 in the source intelligent network interface card 126, allocates access information to the migration cache 1263 based on the read cache information, and records, in the metadata 1221 of the source intelligent network interface card in the source memory 122, the access information allocated to the migration cache, where the access information includes a first access address and a length of the migration cache. The first access address is address information of the source memory 122, the address information is corresponding to start address information of the migration cache 1263, and access address space of the migration cache may be formed based on the access address and the size of the migration cache.

Step S603: The source controller 121 writes, into the register 1264 of the source intelligent network interface card 126, the access information allocated to the migration cache 1263. In specific implementation, only the first access address may be written.

Step S604: The source intelligent network interface card 126 selects, as the migration cache 1263, cache space whose size is the same as the set cache size from the cache 1262, and establishes a mapping relationship between the access information and the migration cache 1263.

When the source controller 121 or another SSD needs to access any location of the migration cache 1263, as long as an access address of the access address space is added to an access command, a physical address of the migration cache that is corresponding to the access address may be found based on a correspondence between the first access address stored in the register and a start address of the migration cache 1263, to implement access to data in the migration cache 1263. In this way, the source controller 121 or the SSD may access the migration cache 1263 of the intelligent network interface card 126 by using the access information. After the migration cache 1263 of the intelligent network interface card 126 is determined, data migration may be performed by using the migration cache 1263.

Structures of the SSDs in the source storage array 120 are also basically the same. Herein, a source SSD 124 is used as an example for description. The source SSD 124 includes a processor 1241, a direct memory access (DMA) controller 1242, a cache 1243, and a flash memory 1244. The processor 1241 is configured to receive a data fetch command sent by the source controller 121, to control access to data 1246 in the flash memory 1244 according to the fetch command of the source controller 121. The DMA controller 1242 may directly access the source memory 122. In addition, because the source controller 121 allocates the access information to the migration cache 1263 in the intelligent network interface card 126, the DMA controller 1242 may directly access the migration cache 1263 of the intelligent network interface card 126. A specific access method is further described in detail in the following description of data migration.

Figure 7A:
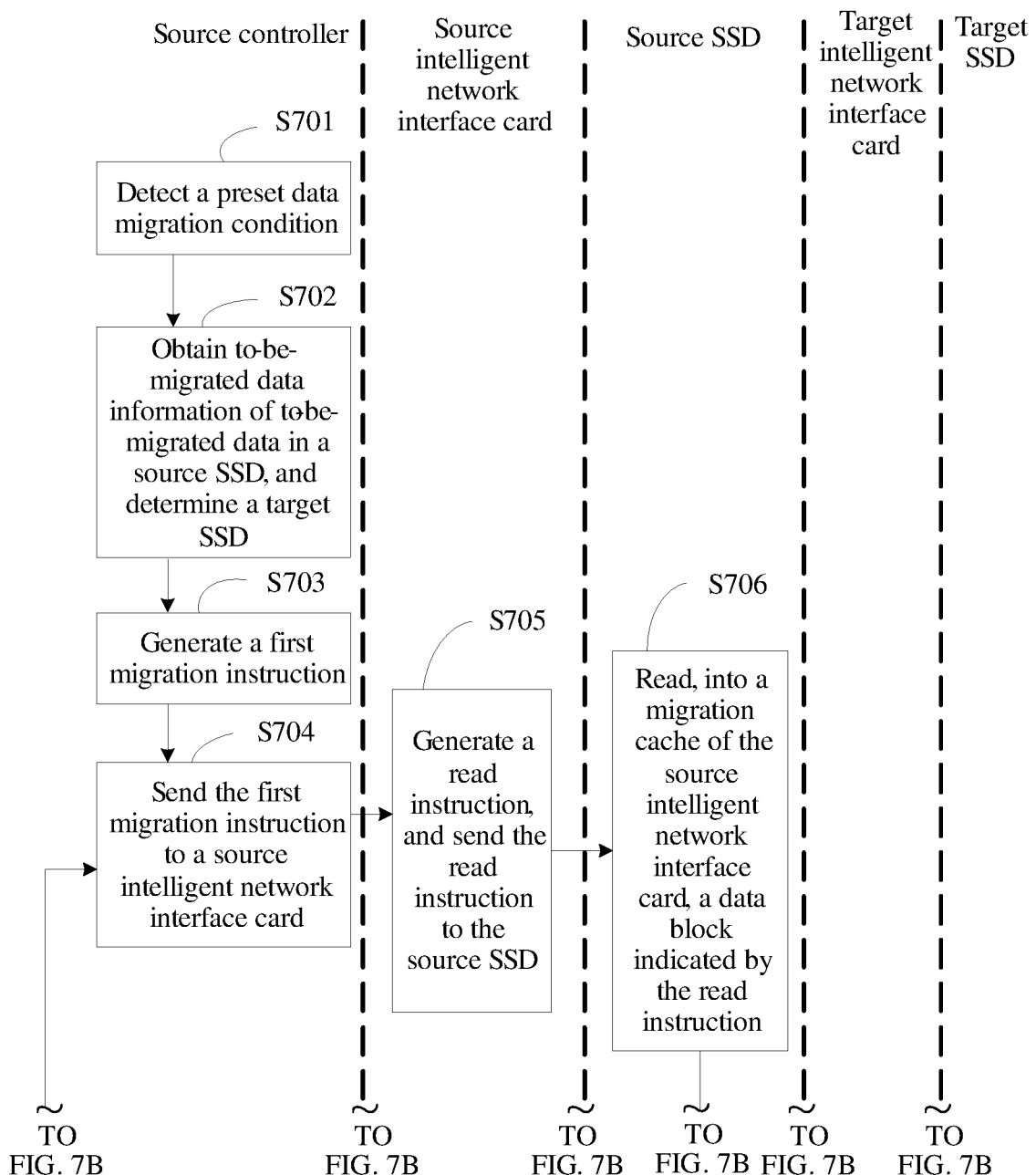
FIG. 7A, FIG. 7B, and FIG. 7C are a flowchart of a method for migrating data of a source storage array to a target storage array according to an embodiment of the present disclosure.
Figure 7B:
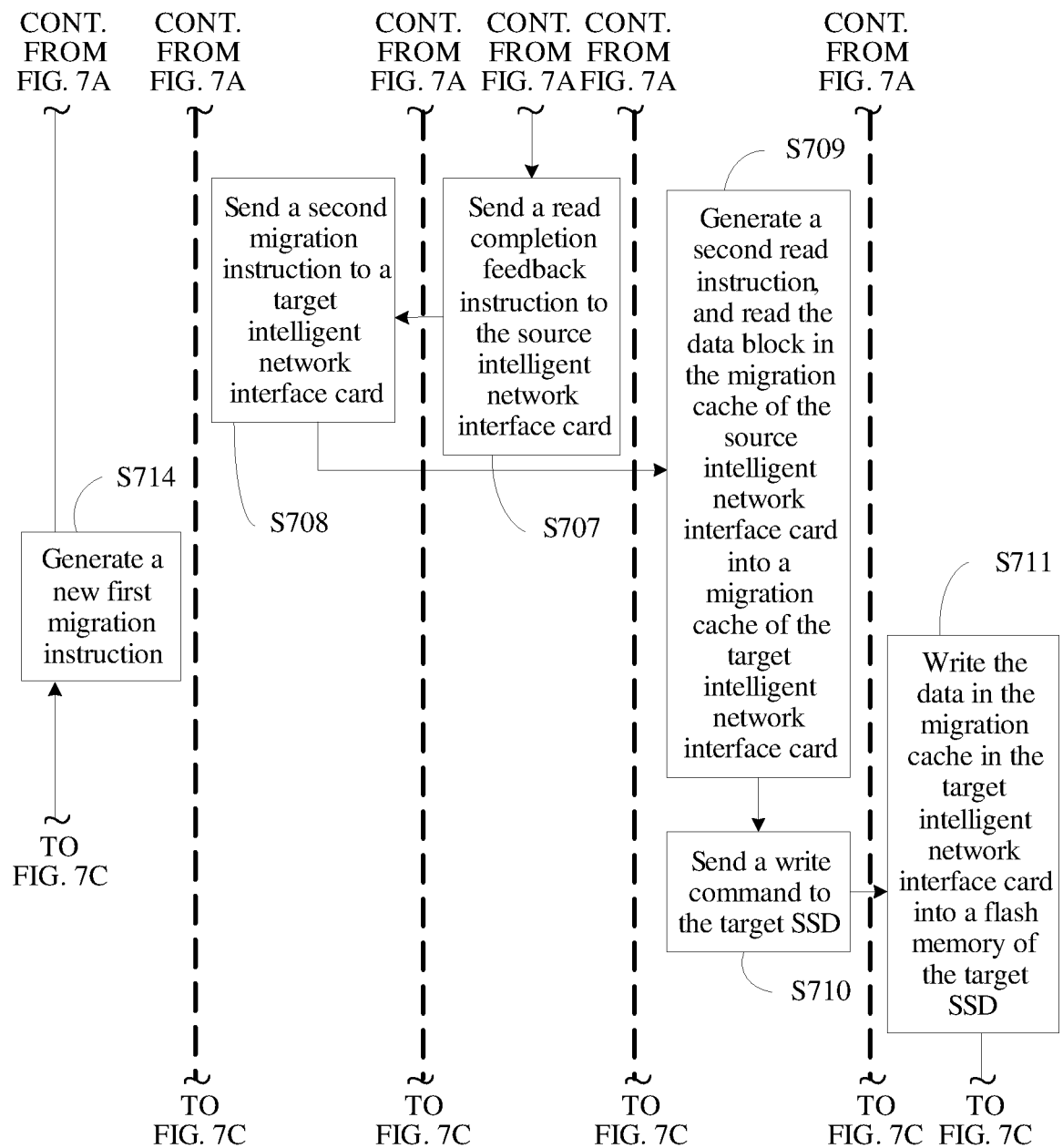
Figure 7C:
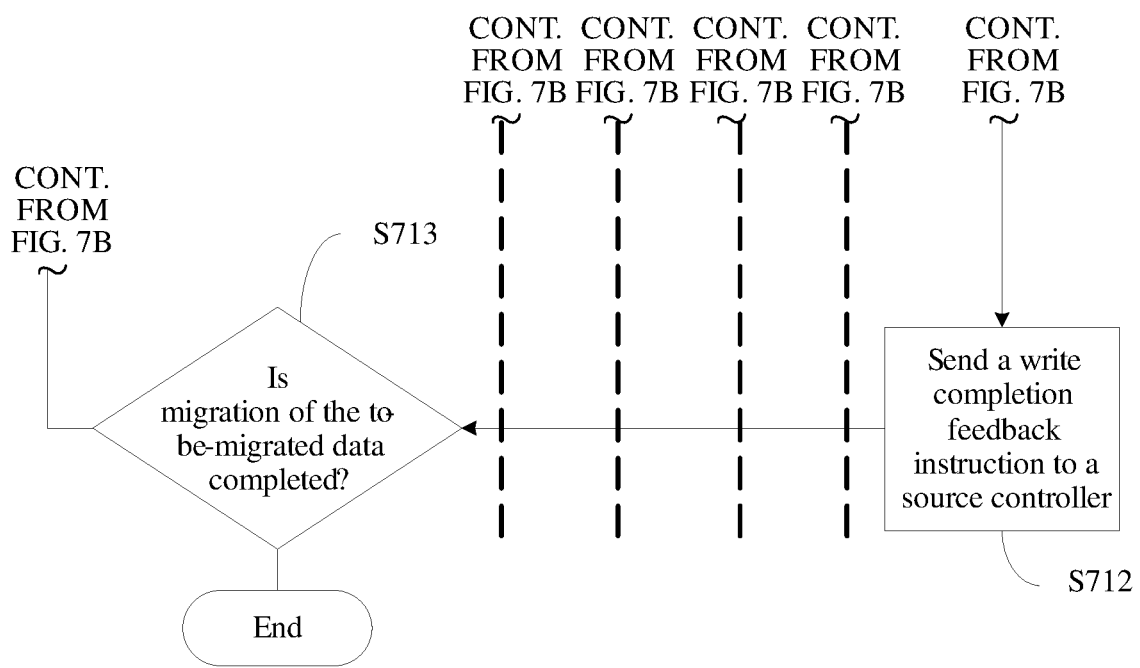

After migration caches of the source intelligent network interface card 126 and the target intelligent network interface card 136 are disposed, data migration may be performed by using the migration caches. A specific migration method is shown in FIG. 7A, FIG. 7B, and FIG. 7C.

Step S701: The source controller 121 detects a preset data migration condition.

The preset migration condition may be that an SSD in the source storage array 126 is determined to be invalidated or when a data migration request is received, the migration request is from an application or another device.

Step S702: When the preset data migration condition is detected, the source controller 121 obtains to-be-migrated data information of to-be-migrated data in an SSD from which data needs to be migrated, that is, a source SSD, and determines a target SSD.

Figure 2:
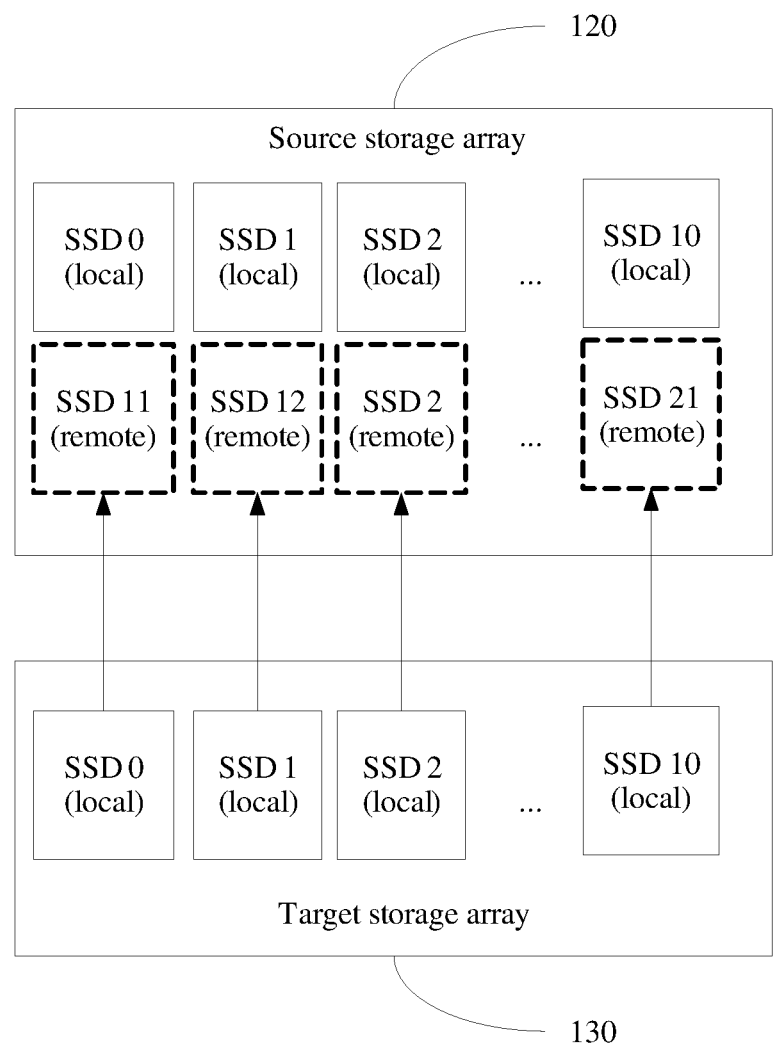
FIG. 2 is a schematic diagram of virtual disk mapping between storage arrays.

The target SSD may be a local SSD in FIG. 2 or a virtual SSD. However, in this embodiment, only a method for migrating data on a premise that the target SSD is a virtual SSD is described. In this embodiment, the virtual SSD 21 is selected as the target SSD.

The source controller 121 obtains the to-be-migrated data information of the to-be-migrated data in the source SSD from the metadata 1221 stored in the source memory 122. The to-be-migrated data information includes a data volume and a logical address of the to-be-migrated data.

The target SSD may be determined by a user, or may be a backup disk disposed for the source SSD in advance. There may be one or more target SSDs, and a specific quantity of target SSDs may be determined according to a data migration speed requirement.

When determining the target SSD, the user may select the target SSD based on a volume of data stored in each SSD and a busy/idle status of the SSD, that is, may select, as the target SSD, an SSD whose current service volume is relatively small and that has more free space. Generally, a control server (not shown in the figure) is disposed in a storage system. The control server includes current status information of all SSDs in the system, for example, a service volume and free space. All users may select the target SSD by accessing the control server, and the control server sends information about the selected target SSD to the source storage array 120.

Step S703: The source controller 121 generates a first migration instruction, where the migration instruction includes information about a to-be-migrated data block in the source SSD, information about the target SSD, and a data length during this migration.

In this implementation, two manners of generating the first migration instruction are provided. The first manner is as follows: The to-be-migrated data is first split into a plurality of data blocks based on a preset data block length during each migration and a preset data volume of the to-be-migrated data that is in the to-be-migrated data information. It should be noted that a length of each data block may be equal to or less than a length of the migration cache. In addition, a logical address of each data block may be determined based on the logical address of the to-be-migrated data and the length of the data block obtained through splitting.

The second manner is as follows: When the first migration instruction is generated, not all to-be-migrated data is split, but one data block is obtained through splitting only for migration performed once, and a length of the data block obtained through splitting is the preset length, and may be less than or equal to the length of the migration cache; and then a logical address of the data block obtained through splitting is determined, and the first migration instruction is generated for the data block obtained through splitting.

The first migration instruction includes a source address and a target address, and the source address is a logical address that is of a data block migrated according to the first migration instruction and that is in the source SSD. As described in this embodiment, the target SSD is located in a remote storage array, and based on two mapping manners of the virtual disk described in FIG. 2, the target address may be an IP address and a logical address of the SSD, or may be an IP address of the target network interface card and a disk identifier and a logical address of the SSD.

When there is a plurality of determined target SSDs, one data block is separately obtained for each target SSD in ascending order of logical addresses of the to-be-migrated data that are in the source SSD, to generate a plurality of first migration instructions.

Step S704: The source controller 121 sends the first migration instruction to the source intelligent network interface card 126.

When generating the plurality of first migration instructions based on the plurality of target SSDs, the source controller 121 sequentially sends, to the source intelligent network interface card 126, the plurality of first migration instructions based on a generation sequence of the plurality of first migration instructions.

Step S705: When receiving the first migration instruction, the source intelligent network interface card 126 generates a first read instruction, and sends the first read instruction to the source SSD. The first read instruction includes a source address, a target address, and a length of a migrated data block, the source address is a logical address of the to-be-migrated data block, and the target address is an access address of the migration cache of the intelligent network interface card.

Step S706: When receiving the read instruction, the source SSD 124 obtains the currently migrated data block from the to-be-migrated data based on the source address and the length of the to-be-migrated data block, and reads the data block into the migration cache of the source intelligent network interface card 126.

In this implementation, after receiving the read instruction, the processor 1241 of the source SSD 124 instructs the DMA controller 1242 to find, in the flash memory of the source SSD based on the source address in the read instruction, a to-be-migrated data block corresponding to the source address, and then write, based on the target address, that is, the access address of the migration cache, the to-be-migrated data block into the migration cache of the source intelligent network interface card 126 that is indicated by the target address. When reading the to-be-migrated data block into the migration cache of the intelligent network interface card 126, the DMA controller 1242 first transmits, by using the PCIe bus 123, the to-be-migrated data block and the target address to the migration cache of the source intelligent network interface card 126 that is indicated by the target address, and the source intelligent network interface card 126 further finds, based on the access address in the target address, a physical address of the migration cache that is corresponding to the access address, and then stores the to-be-migrated data block at a location that is in the migration cache and that is indicated by the physical address.

Step S707: After the to-be-migrated data block is fully read into the migration cache of the source intelligent network interface card 126, the source SSD 124 sends a read completion feedback instruction to the source intelligent network interface card 126.

Step S708: After receiving the read completion feedback instruction sent by the source SSD 124, the source intelligent network interface card 126 determines the target intelligent network interface card 136 based on the target address in the first migration instruction, and then sends a second migration instruction to the target intelligent network interface card 136, where the second migration instruction includes a source address and a target address, the source address in the second migration instruction is an access address that is of a physical interval for storing the to-be-migrated data block and that is in the migration cache of the source intelligent network interface card 126, and the target address in the second migration instruction is determined based on the target address in the first migration instruction.

As described in step S703, when the target address in the first migration instruction is the IP address and the logical address of the target SSD, the source intelligent network interface card 126 may determine the target intelligent network interface card based on the IP address of the target SSD, then determine, based on the IP address and the disk identifier of the SSD that are established during disk mapping, the disk identifier of the target SSD that is corresponding to the IP address of the target SSD, and then use the disk identifier and the logical address as the target address of the second migration instruction.

When the target address in the first migration instruction is the IP address of the target network interface card and the disk identifier and the logical address of the target SSD, the source intelligent network interface card 126 determines the target network interface card based on the IP address of the target network interface card, and uses the disk identifier and the logical address of the target SSD as the target address of the second migration instruction.

Step S709: The target intelligent network interface card 136 generates a second read instruction according to the second migration instruction, where a source address of the second read instruction is the source address of the second migration instruction, a target address of the second read instruction is the access address of the migration cache of the target intelligent network interface card 136, and the target intelligent network interface card 136 reads the to-be-migrated data block in the migration cache of the source intelligent network interface card 126 into the migration cache of the target intelligent network interface card 136 according to the second read instruction.

Herein, the target intelligent network interface card 136 reads the to-be-migrated data block in the migration cache of the source intelligent network interface card 126 by using an RDMA protocol.

Step S710: After the to-be-migrated data block is fully read, the target intelligent network interface card 136 sends a write instruction to the target SSD, where a source address in the write instruction is the access address of the migration cache of the target intelligent network interface card, and a target address in the write instruction is the target address in the second migration instruction.

As described above, the target address includes the disk identifier and logical block address (LBA) of the target SSD. Therefore, the target intelligent network interface card may find the target SSD based on the disk identifier, and find, based on the LBA, a physical address that is in the flash memory of the target SSD and that is used to store the to-be-migrated data block.

Step S711: A processor (not shown in the figure) of the target SSD 134 writes the to-be-migrated data block in the migration cache in the target intelligent network interface card 136 into the flash memory of the target SSD according to the write instruction.

Herein, it should be noted that the target SSD 134 has a same structure as the source SSD 124, the target SSD 134 also includes a DMA controller (not shown in the figure), and the target SSD writes the to-be-migrated data block in the migration cache of the target intelligent network interface card 136 into the flash memory of the target SSD by using the DMA controller.

Step S712: After completing writing of the to-be-migrated data block, the target intelligent network interface card 136 sends a write completion feedback instruction to the source controller 121.

Step S713: After receiving the write completion feedback instruction, the source controller 121 determines whether migration of the to-be-migrated data in the source SSD is completed.

Step S714: If migration is not completed, the source controller 121 generates a new migration instruction, and then a procedure returns to step S703; or if migration is completed, a data migration procedure ends. After receiving a plurality of feedback instructions, the source controller 121 generates one new migration instruction for each feedback instruction.

If the manner of generating the migration instruction in step S703 is the foregoing first manner, in step S714, one data block is determined from data blocks that are still not migrated, and a new read instruction is generated for the determined data block.

If the manner of generating the first migration instruction in step S703 is the foregoing second manner, in step 714, one data block is obtained by splitting to-be-migrated data that is still not migrated, and a new read instruction is generated based on the data block newly obtained through splitting.

In the method provided in the foregoing embodiment, the data in the source SSD may be transmitted to the target SSD without passing through the source memory 122 or the target memory 132. Therefore, bandwidth of the source controller 121 is not occupied, and a speed of migrating data between different storage arrays is increased.

Figure 8:
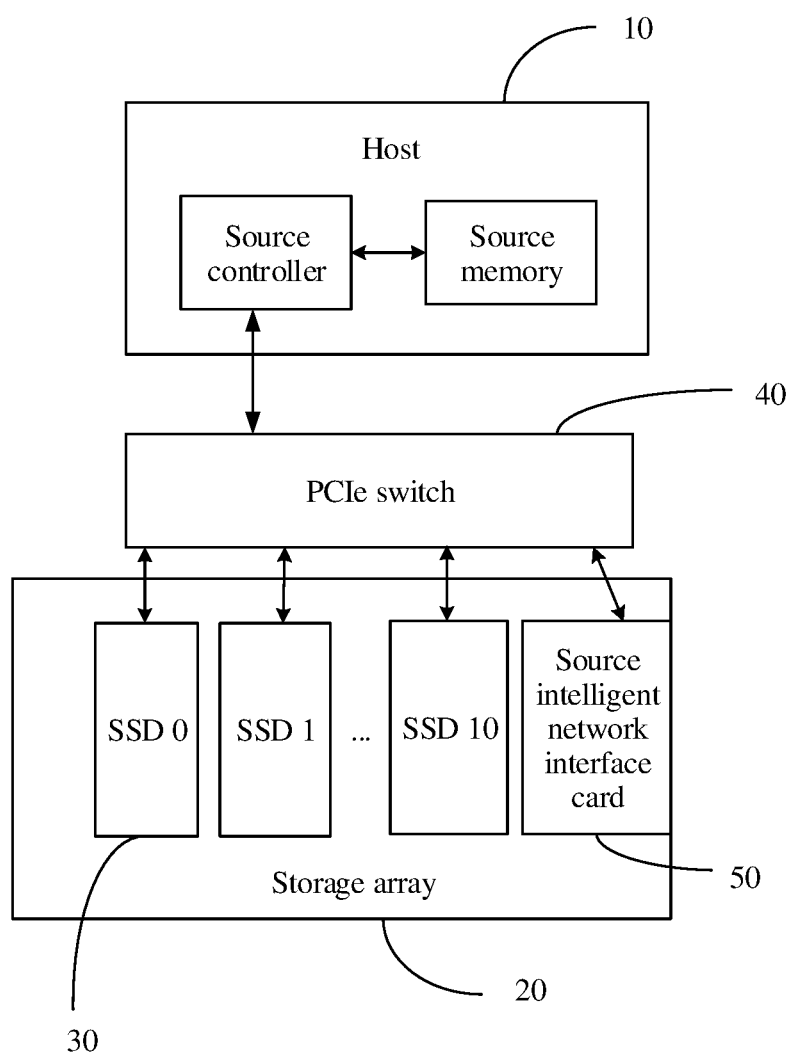
FIG. 8 is an architectural diagram of a storage system according to Embodiment 2 of the present disclosure.

In another implementation of the present disclosure, as shown in FIG. 8, the source controller and the source memory form an independent device, that is, a host 10. The host 10 is connected to a storage array 20 by using a PCIe switch 40, and the storage array includes a plurality of SSDs 30 and an intelligent network interface card 50. In this structure, the source controller still generates and sends a first migration instruction. A structure and an implementation of the intelligent network interface card 50 are the same as those in the foregoing implementation. For details, refer to description in FIG. 6 and FIG. 7A, FIG. 7B, and FIG. 7C. Details are not described herein again.

In addition, the source intelligent network interface card and the target intelligent network interface card may be field-programmable gate arrays (FPGA). In this case, a program in the cache 1262 is burned on a chip of the field programmable gate array instead of being stored in the cache 1262, and the processor 1261 may directly perform the burned program, without a need to invoke the program instruction from the cache 1262 for execution.

Figure 9:
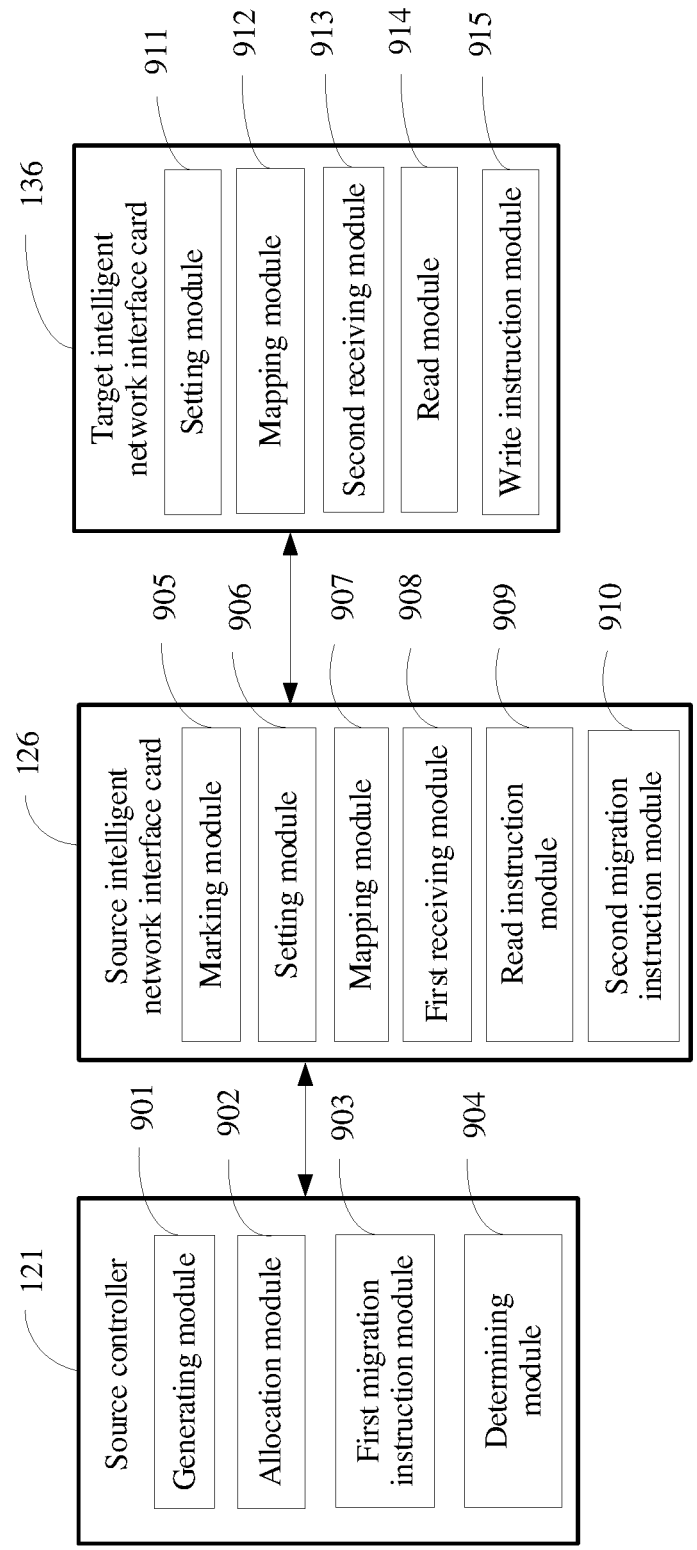
FIG. 9 is a module diagram of each element in a storage system according to an embodiment of the present disclosure.

As shown in FIG. 9, FIG. 9 is module diagrams of the source controller 121 and the source intelligent network interface card 126 in the source storage array 120 in the storage system shown in FIG. 4 and a function module diagram of the target intelligent network interface card 136 in the target storage array 130 in this embodiment.

The source controller 121 includes a generating module 901, an allocation module 902, a first migration instruction module 903, and a determining module 904. The source intelligent network interface card 126 includes a marking module 905, a setting module 906, a mapping module 907, a first receiving module 908, a read instruction module 909, and a second migration instruction module 910. The target intelligent network interface card 136 includes a setting module 911, a mapping module 912, a second receiving module 913, a read module 914, and a write instruction module 915.

In actual implementation, structures of storage arrays in the storage system are basically the same, and function modules included in elements of the storage arrays are also basically the same, but functions implemented by the function modules are different when the storage arrays respectively serve as a source end and a destination end. In this embodiment, only a function module implemented when the storage array serves as a source storage array or a target storage array is described.

When link initialization is performed on each storage array of the storage system, the marking module 905 of the source intelligent network interface card generates identification information of the target intelligent network interface card based on SSD information sent by the target intelligent network interface card. In this case, the identification information may be an IP address allocated to each SSD or an IP address allocated to the target intelligent network interface card. For details, refer to related description in FIG. 2. After receiving information about each SSD that is sent by the source intelligent network interface card, the generating module 901 of the source controller generates a virtual disk of the source storage array based on the information about each SSD. For a specific generation process, refer to related description in FIG. 2.

The setting module 906 of the source intelligent network interface card cooperates with the allocation module 902 of the source controller, to implement a function of allowing the source controller and the SSD to access the migration cache in the source intelligent network interface card. This is corresponding to the method of providing the migration cache by the source intelligent network interface card shown in FIG. 6. Specifically, the setting module 905 of the source intelligent network interface card is configured to set cache information of the migration cache in the register of the source intelligent network interface card. For a specific setting manner, refer to description of step S601.

The allocation module 902 of the source controller is configured to: read the migration cache information of the source intelligent network interface card in the register of the processor of the source intelligent network interface card in a BIOS startup phase of the source storage array, allocate access information to the migration cache of the source intelligent network interface card based on the read migration cache information, record, in metadata, the access information allocated to the migration cache of the source intelligent network interface card, and write, into the register of the source intelligent network interface card, the access information allocated to the migration cache of the source intelligent network interface card. For a specific allocation manner, refer to description of step S602.

The mapping module 907 of the source intelligent network interface card is configured to: select, as the migration cache, cache space whose size is the same as a set cache size from the cache, and establish a mapping relationship between the access information and the migration cache. This is corresponding to step S604.

A function executed by the setting module 910 and the mapping module 911 of the target intelligent network interface card are the same as a function executed by the setting module 906 and the mapping module 907 of the source intelligent network interface card, that is, setting the migration cache for the target intelligent network interface card. For details, refer to related description of setting the migration cache of the source intelligent network interface card. Details are not described herein again.

The first migration instruction module 903 of the source controller is configured to: detect a preset data migration condition, and when the preset data migration condition is detected, obtain to-be-migrated data information of to-be-migrated data in a source SSD, determine a target SSD, then generate a first migration instruction based on the to-be-migrated data information of the to-be-migrated data and information about the target SSD, and send the first migration instruction to the source intelligent network interface card. A function executed by the first migration instruction module 903 is corresponding to steps S701 to S704 in FIG. 7A, FIG. 7B, and FIG. 7C. Two manners of generating the first migration instruction are the same as those in step S703. Details are not described herein again.

The first receiving module 908 is configured to receive the first migration instruction, and the read instruction module 909 of the source intelligent network interface card generates a read instruction according to the first migration instruction, to instruct the source SSD to read the to-be-migrated data in the source SSD into the migration cache of the source intelligent network interface card. For details, refer to description of steps S705 to S707 in FIG. 7A, FIG. 7B, and FIG. 7C.

After the to-be-migrated data is migrated to the migration cache of the source intelligent network interface card, the second migration instruction module 910 of the source intelligent network interface card sends a second migration instruction to the target intelligent network interface card. For details, refer to description of step S708 in FIG. 7A, FIG. 7B, and FIG. 7C.

The second receiving module 913 of the target intelligent network interface card receives the second migration instruction, and the read module 914 of the target intelligent network interface card generates a second read instruction according to the second migration instruction, and executes the generated second read instruction to read the to-be-migrated data in the migration cache of the source intelligent network interface card into the migration cache of the target intelligent network interface card. For details, refer to description of step S709 in FIG. 7A, FIG. 7B, and FIG. 7C.

After the to-be-migrated data is migrated to the migration cache of the target intelligent network interface card, the write instruction module 915 of the target intelligent network interface card sends a write instruction to the target SSD, to instruct the target SSD to write the to-be-migrated data in the target intelligent network interface card into a flash memory of the target SSD. For details, refer to steps S710 to S712 in FIG. 7A, FIG. 7B, and FIG. 7C.

After the to-be-migrated data block is written into the flash memory of the target SSD, the determining module of the source controller further determines whether migration of the to-be-migrated data in the source SSD is completed. If migration is not completed, a new migration instruction is generated to continue performing migration until all to-be-migrated data in the source SSD is migrated; or if migration is completed, a migration procedure ends. For details, refer to description of step S713 in FIG. 7A, FIG. 7B, and FIG. 7C.

As shown in FIG. 5, the cache of the source intelligent network interface card further stores a program instruction (not shown in the figure), and the processor of the source intelligent network interface card executes the program instruction to implement corresponding steps executed by the source intelligent network interface card in the flowchart shown in FIG. 7A, FIG. 7B, and FIG. 7C. Likewise, the cache of the target intelligent network interface card also stores a program instruction (not shown in the figure), and the processor of the target intelligent network interface card executes the program instruction to implement corresponding steps executed by the target intelligent network interface card in the flowchart shown in FIG. 7A, FIG. 7B, and FIG. 7C.

The technology for migrating data between storage arrays provided in the embodiments of the present disclosure is described in detail above. The principle and implementation of the present disclosure are described herein by using specific examples. The description of the foregoing embodiments is merely intended to help understand the method and core ideas of the present disclosure. In addition, a person of ordinary skill in the art can make variations and modifications to the present disclosure in terms of the specific implementations and scopes according to the ideas of the present disclosure. Therefore, the content of this specification shall not be construed as a limit to the present disclosure.

What is claimed is:

1. A method implemented by a source network interface card of a source storage, the method comprising:
   receiving a first migration instruction comprising a first address, wherein the first address is of data in a source storage drive of the source storage;
   sending, to the source storage drive, a read instruction comprising the first address;
   allocating an Internet Protocol (IP) address to a target storage drive or a target network interface card in response to a connection being established between a target storage and the source storage;
   determining the target network interface card based on the IP address; and
   sending, to the target network interface card of the target storage and after determining the target network interface card, a second migration instruction comprising a second address,
   wherein the second address is in the target storage drive in the target storage and is where the data are to be migrated, and
   wherein the second migration instruction instructs the target network interface card to migrate the data from the source storage drive to the target storage drive.

2. The method of claim 1, wherein the read instruction further comprises access information of a source migration cache of the source network interface card, wherein the read instruction instructs the source storage drive to read the data into the source migration cache, and wherein the access information comprises a memory address allocated by a controller of the source storage to the source migration cache.

3. The method of claim 1, further comprising further allocating the IP address to the target storage drive.

4. The method of claim 3, further comprising:
   storing a mapping relationship between the IP address and a disk identifier of the target storage drive;
   determining the disk identifier based on the mapping relationship and the IP address; and
   using, as the second address, the disk identifier and a logical address for storing the data in the target storage drive.

5. The method of claim 1, further comprising further allocating the IP address to the target network interface card, wherein the first migration instruction further comprises the IP address.

6. The method of claim 5, further comprising using, as the second address, a disk identifier of a target storage device and a logical address for storing the data in the target storage device.

7. The method of claim 1, wherein the source storage is a source storage array, and wherein the target storage is a target storage array.

8. The method of claim 1, wherein the first migration instruction further comprises information about a target storage device to which the data is to be migrated, and wherein the target storage device is in the target storage.

9. The method of claim 1, wherein the read instruction instructs the source storage drive to read the data into a source migration cache.

10. The method of claim 1, wherein the read instruction further comprises access information of a source migration cache of the source network interface card, and wherein the read instruction instructs the source storage drive to read the data into the source migration cache.

11. A source network interface card of a source storage, the source network interface card comprising:
    a first controller configured to:
    receive a first migration instruction comprising a first address, wherein the first address is of data in a source storage drive of the source storage;
    send, to the source storage drive, a read instruction comprising the first address;
    allocate an Internet Protocol (IP) address to a target storage drive or a target network interface card when a connection is established between a target storage and the source storage;
    determine the target network interface card based on the IP address; and
    send, to the target network interface card of the target storage and after determining the target network interface card, a second migration instruction comprising a second address,
    wherein the second address is in the target storage drive in the target storage and is where the data are to be migrated, and
    wherein the second migration instruction instructs the target network interface card to migrate the data from the source storage drive to the target storage drive.

12. The source network interface card of claim 11, wherein the read instruction further comprises access information of a source migration cache of the source network interface card, wherein the read instruction instructs the source storage drive to read the data into the source migration cache, and wherein the access information comprises a memory address allocated by a second controller of the source storage to the source migration cache.

13. The source network interface card of claim 11, wherein the first controller is further configured to further allocate the IP address to the target storage drive.

14. The source network interface card of claim 13, wherein the first controller is further configured to store a mapping relationship between the IP address and a disk identifier of the target storage drive, and wherein the first controller is further configured to:
    determine the disk identifier based on the mapping relationship and the IP address; and
    use, as the second address, the disk identifier and a logical address for storing the data in the target storage drive.

15. The source network interface card of claim 11, wherein the first controller is further configured to further allocate the IP address to the target network interface card, wherein the first migration instruction further comprises the IP address.

16. The source network interface card of claim 15, wherein the first controller is further configured to use, as the second address, a disk identifier and a logical address for storing the data in the target storage drive.

17. The source network interface card of claim 11, wherein the source storage drive is a source solid-state drive (SSD), and wherein the target storage drive is a target solid-state drive (SSD).

18. The source network interface card of claim 11, wherein the source storage is a source storage array, and wherein the target storage is a target storage array.

19. The source network interface card of claim 11, wherein the first migration instruction further comprises information about a target storage device to which the data are to be migrated, and wherein the target storage device is in the target storage.

20. A storage apparatus comprising:
a central processing unit (CPU) for data storing; and
a source network interface card coupled to the CPU and comprising:
 a first controller configured to:
  receive a first migration instruction comprising a first address, wherein the first address is of data in a source storage drive of a source storage;
  send, to the source storage drive, a read instruction comprising the first address;
  allocate an Internet Protocol (IP) address to a target storage drive or a target network interface card when a connection is established between a target storage and the source storage;
  determine the target network interface card based on the IP address; and
  send, to the target network interface card of the target storage and after determining the target network interface card, a second migration instruction comprising a second address,
 wherein the second address is in the target storage drive in the target storage and is where the data are to be migrated, and
 wherein the second migration instruction instructs the target network interface card to migrate the data from the source storage drive to the target storage drive.

* * * * *